Aug. 31, 1965   D. D. RAHRIG ETAL   3,203,279
POWER TRANSMISSION DEVICE
Filed Oct. 11, 1960   3 Sheets-Sheet 2

INVENTORS
Donald D. Rahrig and
BY James F. LaPlante
Nobbe & Swope
ATTORNEYS

INVENTORS
Donald D. Rahrig and
BY James F. LaPlante
Nobbe & Swope
ATTORNEYS

United States Patent Office 3,203,279
Patented Aug. 31, 1965

3,203,279
POWER TRANSMISSION DEVICE
Donald D. Rahrig and James F. La Plante, Toledo, Ohio, assignors to Libbey-Owens-Ford Glass Company, Toledo, Ohio, a corporation of Ohio
Filed Oct. 11, 1960, Ser. No. 61,986
2 Claims. (Cl. 74—722)

This invention relates broadly to power transmission devices and more particularly to an improved magnetic clutch for rapidly changing the rate of speed at which a driving force is transmitted from a motor.

Although not restricted to any particular method of transmitting the rotary power of a motor, the power transmission device of this invention has been found to be most useful in connection with roll conveyors in which selected sections are operated at rapidly changing rates of speed. A roll conveyor driven by the power transmission device in accordance with the invention can be employed to carry a series of articles along a primary or entry roll section at one speed of movement and as each article in sequence enters an adjoining roll section of the conveyor, the speed of movement is accelerated and then rapidly decelerated as each article is moved from the primary conveyor section. Alternatively, the transmission device is adapted to rapidly reduce the speed of movement and then increase the advancing speed of article movement. In any event, the structure of this improved device is adapted to operate for longer periods of service and in areas of relatively higher heat than transmission devices or clutches heretofore employed for the same or a like purpose.

It is therefore the primary object of this invention to provide a power transmission device having a driving part operating at one rate of speed and adjoining driven parts adapted to transmit the power of a motor at differing rates of speed.

Another object of the invention is to provide a power transmission device of the above character whereby the changes of speed in transmitting motor power can be made in rapidly occurring order by means of a magnetic clutch.

Another object of the invention is to provide a device of the above character wherein the component parts of the clutch are aligned on a common driver shaft.

Another object of the invention is to provide a clutch of the above character wherein the selective engagement of a driving armature part with either of two driven field parts can be automatically and rapidly obtained.

A further object of the invention is to provide a magnetic clutch comprised of a single armature and two associated field members of highly durable structures adapted to long periods of continuous service in areas of relatively high temperature.

Other objects and advantages of the invention will become more apparent during the course of the following description when read in connection with the accompanying drawings.

In the drawings, wherein like numerals are employed to designate like parts throughout the same:

Figure 1:
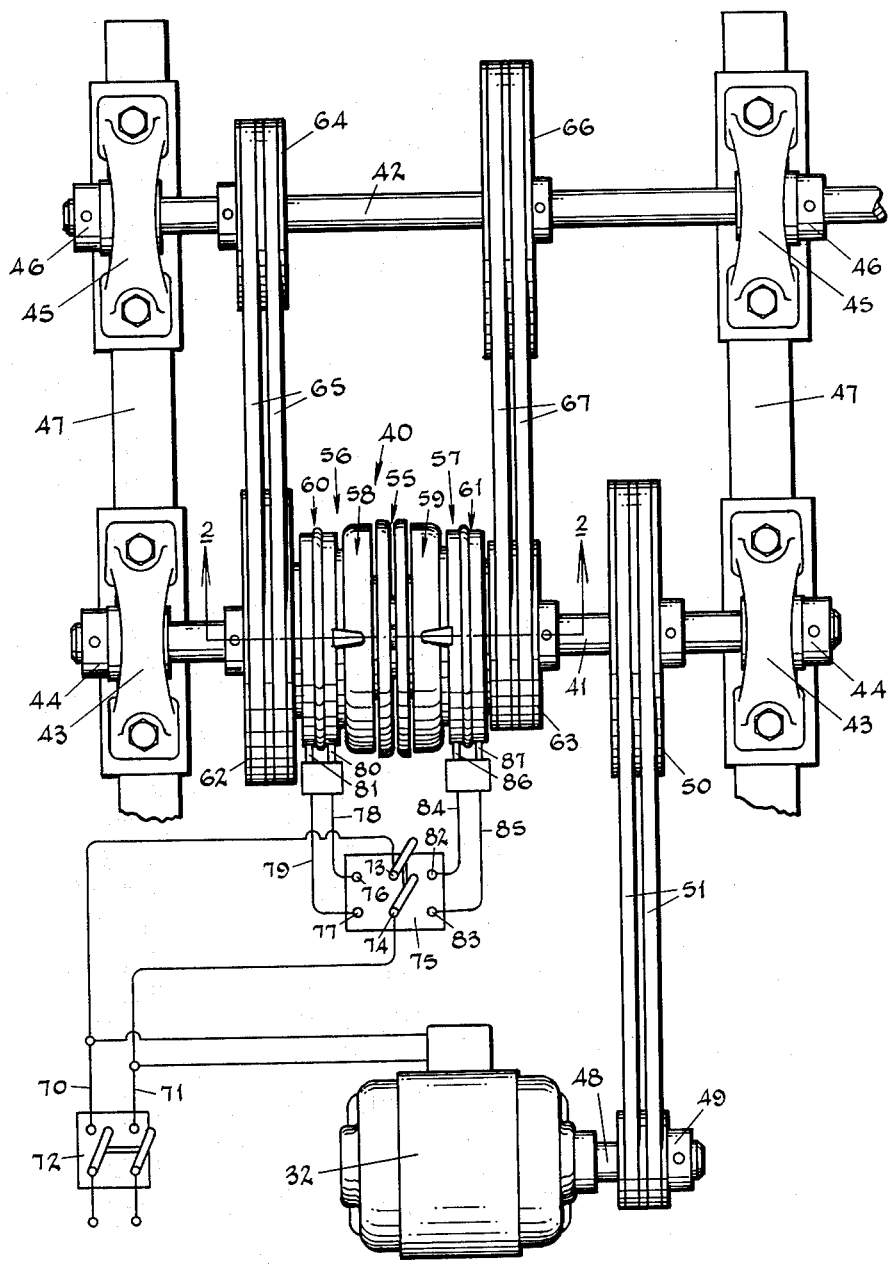
FIG. 1 is a plan view of a power transmission device employing magnetic clutches and constructed in accordance with the invention.

Referring now to FIG. 1 of the drawings, there is shown a power transmission device constructed in accordance with this invention and including a magnetic clutch generally designated by the numeral 40. By way of example which is in no way a restrictive illustration of its utility the clutch 40 is bodily mounted on a shaft 41 that is driven by an electric motor 32 and in turn drives a shaft 42. The shaft 41 is journaled at its ends in pedestal bearings 43 and maintained from endwise motion therein by lock collars 44. Likewise, the shaft 42 is supported in bearings 45 and restricted from endwise motion by lock collars 46; the pairs of bearings 43 and 45 being secured to a base structure indicated at 47. The output shaft 48 of the motor 32 is provided with a sheave 49 that is coupled to a sheave 50, fixedly mounted on the shaft 41, by conventional V-type belts 51. The proportionate pitch diameter of the sheave 49 to that of the sheave 50 is determined by the preferred rate of speed at which the shaft 41 is to be driven.

Generally speaking, the clutch 40 of the power transmission device comprises a driving or armature member 55, adapted to rotate with the shaft 41, and two driven members 56 and 57 rotatably carried by the shaft and equipped with field pieces 58 and 59. Each field is adapted to be placed in an electric circuit in the usual manner by means of ring conductors generally designated at 60 and 61. To transmit power from the shaft 41 to shaft 42, the driven clutch members 56 and 57 are each provided with sheaves 62 and 63 respectively. Thus, the sheave 62 is coupled to a sheave 64 on the shaft 42 by belts 65 and, as herein shown, the pitch diameter of the sheave 62 is greater than the pitch diameter of sheave 64 in order that while power is transmitted by the clutch 40 through the sheave 62, the shaft 42 will be rotatively driven at a higher rate of speed than that at which the shaft 41 is driven by the motor 32.

On the other hand, the sheave 63, associated with the driven clutch member 57, is operatively connected to a second sheave 66 on shaft 42 through belts 67; the sheave 63 having a smaller pitch diameter than that of the sheave 66 to drive the same at a slower rate of speed.

Essentially the rate of speed transmitted to the shaft 42 will be seen to be rapidly variable according to which of the sheaves, 62 or 63, is selected to be operatively driven by the shaft 41. A simplified form of selective control is diagrammatically shown in FIG. 1 to include an electric source which is completed to supply lines 70 and 71 through a switch 72. The supply lines may be connected to the motor 32 and also to the center poles 73 and 74 of a double throw switch 75. The poles 76 and 77 of this switch are connected by lines 78 and 79 to conventional contact brushes 80 and 81 associated with the ring conductor 60 while the opposed poles 82 and 83 are similarly connected by lines 84 and 85 to the brushes 86 and 87 associated with the ring conductors 61. Accordingly, in the manual selection of the speed at which the shaft 42 is to be driven, upon completion of a circuit through switch poles 73–76 and 74–77 to brushes 80 and 81, the field 58 will attract the armature 55 thereby clutching the driven member 56 to the shaft 41 and consequently driving the shaft 42 at a high rate of speed through the sheaves 62 and 64 by the belts 65. On the other hand, when a circuit is completed through poles 73–82 and 74–83 and lines 84 and 85, the brushes 86 and 87 will supply electrical energy to the ring conductor 61 whereby the field 59 will attract the armature 55 to transmit driving power from the shaft 41 through the sheave 63 on clutch member 57, and belts 67 to the sheave 66 on shaft 42 to drive the same at a comparably slower rate of speed.

Figure 2:
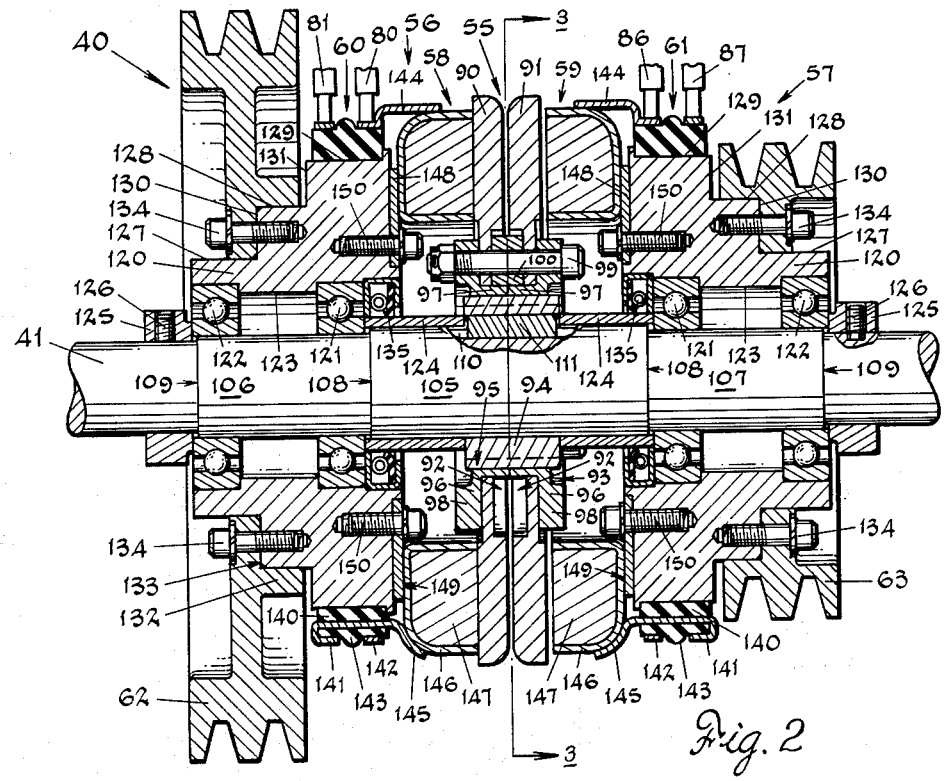
FIG. 2 is a longitudinal, vertical section of the device taken on line 2—2 of FIG. 1.
Figure 3:
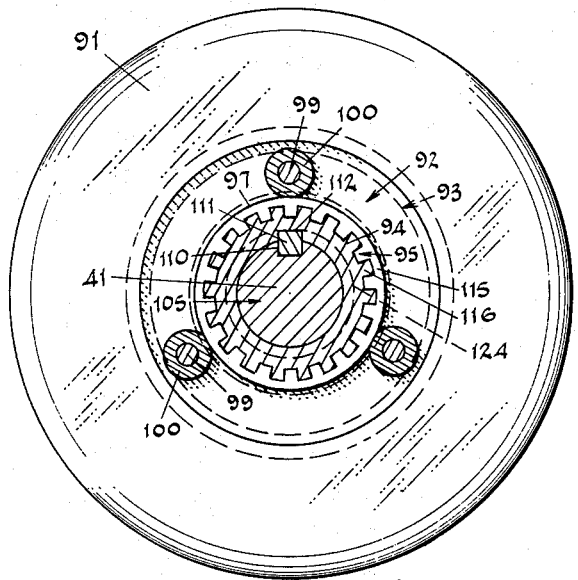
FIG. 3 is a transverse, vertical section of the device taken on line 3—3 of FIG. 2.

Referring now to FIGS. 2 and 3, the driving element or armature 55 of the clutch 40 includes a pair of annular discs or plates 90 and 91 having centrally disposed recessed areas 92 placed in opposition to one another. The plates 90 and 91 are mounted in axial relation and retained in suitably spaced relation by a clamping member 93 that is supported on the shaft 41 by means of a drive sleeve 94. As herein provided, the clamping member 93 is caused to rotate with the sleeve 94 through a spline connection 95 which enables the clamping member to move axially therealong. For this purpose, the clamping member 93 is formed by complementary sections 96; each having a tubular hub 97 on one surface and an annular flanged rim 98 on the opposite surface. The armature plates 90 and 91 are fitted onto the outer peripheries of the tubular hubs 97 of the respective clamping sections which are then assembled with the ends of said hubs being placed in axial abutting relation. By means of bolt and nut connections 99 and spacers 100 received in the recesses 92, the armature plates 90 and 91 are maintained in spaced relation and with the complementary sections of the clamping member 93 form a substantially integral unit. Preferably, the bolts 99, spacers 100 and sections 96 of the clamping member 93 are of a dielectric material, such as brass or bronze, to suitably insulate the spaced plates 90 and 91 from the shaft 41.

As illustrated in FIG. 2, the shaft 41 is formed with three areas having diameters increasing stepwise from the diameters at the ends thereof. Thus, a central area 105 is of a larger diameter than the adjoining areas 106 and 107 and defines shoulders 108 therebetween. Likewise, the areas 106 and 107 are of a larger diameter than the outwardly directed ends of the shaft 41 and are defined by shoulders 109. Also, the centrally disposed area 105 is provided with keyway 110 in which is received a key 111 inter-fitting with a registering keyway 112 in the inner peripheral surface of the drive sleeve 93.

As aforementioned, the clamping member 93 is operably connected with the drive sleeve 94 by means of the spline connection 95 and, for this purpose, the inner periphery of each tubular hub 97 is provided with internal spline portions 115 while the outer periphery of the sleeve 94 is formed with inter-fitting external splines 116. This enables the plates 90 and 91, constituting the armature 55, to slide bodily along and relative to sleeve 94, dependent upon which field 58 or 59 is energized, while being rotated by the shaft 41 in an uninterrupted manner.

Each of the driven clutch members 56 and 57 are of substantially the same basic structure and the like parts of each will be designated by the same numeral to reduce duplication of their description. Thus, each clutch member 56 or 57 includes a cone-shaped sheave mounting member 120 that is rotatably supported in the respective positions of the clutch members on either of the shaft areas 106 or 107 by pairs of bearings 121 and 122. For this purpose, the ends of axial bore 123 of the member 120 are counterbored to receive the bearings 121 and 122. The inwardly disposed bearings 121 are retained in their positions by tubular spacers 124 on either side of the drive sleeve 94 and which at their outer ends engage the inner races of the adjacent bearings 121. Likewise, the inner races of the bearings 122 are engaged by lock collars 125 that are secured to the respective ends of the shaft 41 by set-screws 126. This enables each of the members 120 to be equally spaced from the drive sleeve 94 and at the same time independently rotatable without undue endwise movement. The cone formation of each mounting member 120 provides three annular surfaces 127, 128 and 129 with intervening shoulders 130 and 131. In the case of the sheave 62, the hub 132 thereof is counterbored as to 133 to receive the shoulder 130 and be axially aligned with the annular surface 128. The sheave 62 is fixedly mounted on its respective member 120 by screws 134 passed through the flat flange of the counterbore and threaded into suitably tapped holes in the body of the member. This is also true of the sheave 63 that is mounted on its respective member 120 in the same manner and secured by like bolts 134. The inwardly directed surface of the outer race of each bearing 121 is also engaged by a grease seal ring 135 riding on the outer surface of each spacer 124 at the end adjacent said bearing.

The ring conductors heretofore generally designated by the numerals 60 and 61 are formed by an assembly which is secured on an insulator ring 140 that is fitted onto the annular surface 129 of each mounting member 120. Two slip rings 141 and 142 encircle the insulator ring 140 and are held in spaced relation to one another by means of an annular rim 143 formed integrally with the ring in its medial area. The rings 141 and 142 are adapted to serve as electrical conductors and are engaged by the brushes 80–81 or 86–87. To connect the rings to their respective field pieces 58 and 59, suitable fingers or wires 144 and 145 are extended therefrom and placed in contact with the fields.

The field pieces 58 and 59 of the respective driven clutch members 56 and 57 comprise an annular substantially U-shaped steel case 146 and the field coil 147 contained within said case. The open face of the annular case 146 and the surface of the coil 147, in each instance, are directed toward the adjacent surface of the armature plate 90 or 91 as the case may be. The case 146 is carried by the mounting member 120 of the associated clutch member by means of an adaptor ring 148 which is welded as at 149 along its outer marginal area to the outer surface of the case and secured to the mounting member 120 by means of screws 150 passing through suitable openings, provided in the inner marginal area of the ring, and threaded into tapped holes in the body of member 120.

While a manually selective system has been above described in connection with the magnetic clutch 40 as viewed in FIG. 1, provision has been made to employ the power transmission device and clutch of this invention in a more practical situation which involves rapidly alternating changes of speed under conditions requiring substantially automatic control. For example, as previously mentioned the shaft 42 may be employed to drive selected sections of a conveyor wherein it is desired to rapidly advance an article from a preceding conveyor section and to then as rapidly reduce its rate of movement. Since the alternating phases of speed change will occur upon the entry of a progression of articles along the conveyor, it becomes apparent that the power transmission device must be adapted to function continuously in an efficient manner and for long periods of time. Usually a form of control is employed wherein the speed changes will be produced by the articles themselves as by limit switches, electric eye devices and the like. Such devices would be adapted to replace the manual switch 75 shown in FIG. 1.

Figure 4:
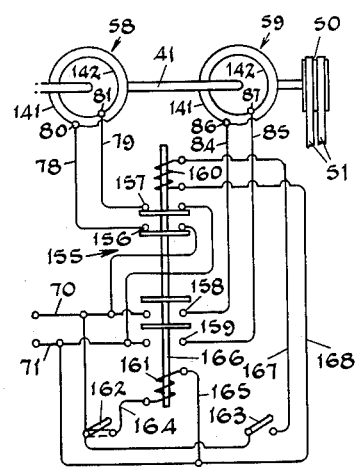
FIG. 4 is a diagrammatic view of an electric system for automatically operating the power transmission device.

Thus, as shown in FIG. 4, a multiple contact relay switch 155 is provided with contacts 156, 157, 158 and 159, the contacts 156 and 158 being connected on one side to the supply line 70 while the contacts 157 and 159 are likewise connected to suply line 71. On their opposite sides, contacts 156 are connected by line 78 to brush 80; contacts 157 by line 79 to brush 81; contacts 158 by line 84 to brush 86 and contacts 159 by line 85 to brush 87. The circuits of solenoids 160 and 161 of switch 155 are completed through switches 162 and 163 which close and open substantially automatically. In one practical use of the clutch 40, the switches 162 and 163 may be closed and sequentially opened during the movement of articles along a section of a conveyor that is driven by the power transmission device in which the articles are to be rapidly advanced after which the lineal speed of the conveyor section is to be reduced, or vice versa.

Accordingly, as shown in FIG. 4, the limited switch 162 is adapted when closed (as shown in broken line), to complete a circuit from supply line 70 through line 164 to the solenoid 161 of relay switch 155 and thence by line 165 to supply line 71. This will cause armature 166 to disengage the pairs of contacts 158 and 159 and simultaneously engage the pairs of contacts 156 and 157 thereby completing the circuit to the field piece 58 by way of lines 78–79, brushes 80 and 81 and conductor rings 141 and 142. In this situation, the armature or driving part 55 will be attracted to the field piece 58 with a resultant transmission of motor power from shaft 41 and sheave 62 to the sheave 64 on shaft 42 by belts 65. Since, as above stated, the sheave 62 has a larger pitch diameter than that of the sheave 64, the ratio of speed between shafts 41 and 42 will be increased and the resultant speed of movement highly accelerated. However, when the switch 163 is engaged, completion of the circuit from line 70 through line 167 to the opposed solenoid 160 of the relay switch 155 and thence by line 168 to line 71 will act to reverse the position of the armature 166 thereby disengaging pairs of contacts 156 and 157 and engaging pairs of contacts 158 and 159 to open the circuit of lines 78 and 79 and complete a circuit through lines 84 and 85, brushes 86 and 87 to conductor rings 141 and 142 of the driven clutch member 57.

Figure 5:
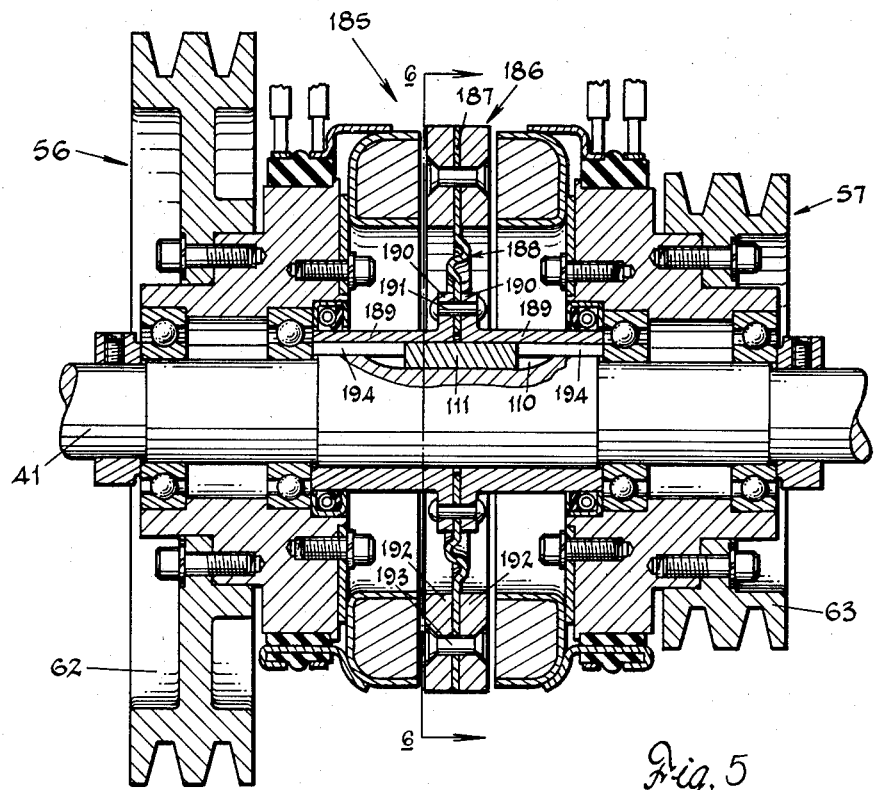
FIG. 5 is a longitudinal, vertical section of a modified form of transmission device.
Figure 6:
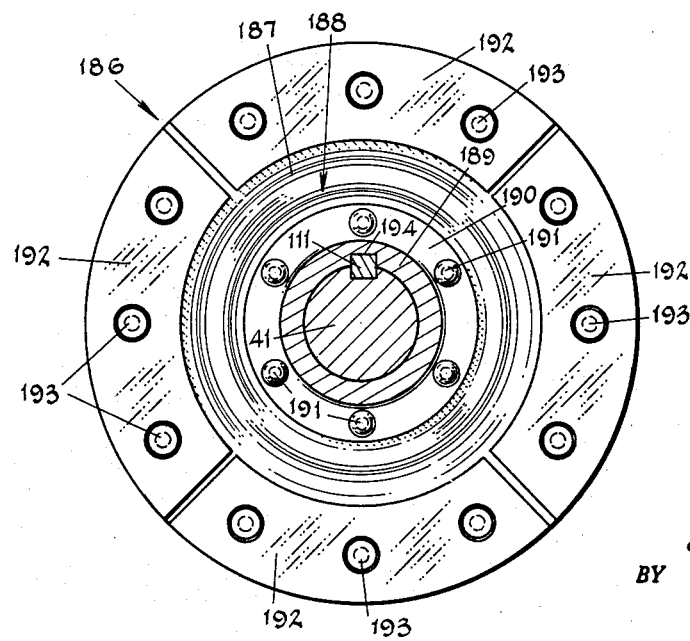
FIG. 6 is a transverse vertical section taken on line 6—6 of FIG. 5.

Referring now to FIGS. 5 and 6 of the drawings, there is shown a modified form of clutch, generally designated by the numeral 185. Essentially the clutch 185 embraces all of the novel features of the clutch illustrated in FIGS. 2 and 3 so that the driven clutch members 56 and 57 may be said to be identical in both forms while the driving member or armature embodying the additional novel features is individually identified by the numeral 186. Whereas the driving coupling between the shaft 41 and the member 55 included a spline connection in the above-described embodiment, in the modified form, part 186 comprises an annular diaphragm ring or plate 187 having a series of concentrically arranged corrugations 188 formed between the inner and outer margins thereof. The inner margins of ring 187 are received between tubular hubs 189 having oppositely disposed flanges 190 to which the plate is secured by rivets 191. As viewed in FIG. 6, the armature is formed by a series of arcuate bodies 192 that are secured in spaced relation about the outer margin of the plate 187 by rivets 193 and preferably with the opposed heads of said rivets countersunk beneath the active faces of the armature bodies. Each of the tubular hubs 189 is provided with a keyway 194 in which is received the key 111 which heretofore has been described as being seated in the keyway 110 of the shaft 41.

In the modified form of the invention, upon completion of a circuit to the field piece 58, the plate 187 deflects permitting the armature to move into gripping engagement with the coil. The deflection of the plate 187, as the armature bodies are attracted by the field coil 147, will be absorbed in the corrugations 188, thus reducing or even eliminating the possibility of fatigue of the plate 187.

It is to be understood that the forms of the invention herewith shown and described are to be taken as illustrative embodiments only of the same, and that various changes in the shape, size and arrangement of parts may be resorted to without departing from the spirit of the invention.

We claim:

1. In a power transmission device, the combination of, a base, a driving shaft journaled on said base to rotate about a fixed axis, power means rotating said driving shaft, a driving member splined on said driving shaft to rotate therewith, a pair of driven members mounted on said shaft and disposed on opposite sides of said driving member for rotation relative to said shaft, friction faces formed on opposite sides of said driving member to cooperate with contiguous faces formed on said driven members, means selectively shifting said driving member toward one or the other of said driven members thereby to bring one or the other of said contiguous faces into gripping engagement with one or the other of said driving member friction faces, a driven shaft journaled on said base to rotate about an axis parallel to said fixed axis, and means coupling each of said driven members to said driven shaft to drive said driven shaft in the same direction at either of two different speeds.

2. In a power transmission device, the combination of, a driving shaft journaled to rotate about a fixed axis, a driving member coaxially mounted on said driving-shaft to rotate therewith, radially disposed friction faces formed on opposite sides of said driving member, a pair of driven members mounted on said driving shaft and disposed along the shaft on opposite sides of said driving member for rotation relative to said driving shaft, radially disposed friction faces formed on each of said driven members opposed to and in contiguous relation to said faces on said driving member, means shifting said driving member selectively toward one or the other of said driven members to bring the adjacent friction faces into gripping engagement, a driven shaft journaled to rotate about an axis parallel to said fixed axis, and means coupling said driven members to said driven shaft to drive said driven shaft in the same direction at either of two different speeds.

References Cited by the Examiner

UNITED STATES PATENTS

| | | | |
|---|---|---|---|
| 731,471 | 6/03 | Le Pontois. | |
| 731,472 | 6/03 | Le Pontois. | |
| 1,814,424 | 7/31 | Barr | 74—365 |
| 1,856,669 | 5/32 | Sylvester | 198—127 |
| 1,866,675 | 7/32 | Sarazin. | |
| 2,407,757 | 9/46 | MacCallum. | |
| 2,573,152 | 10/51 | Leifer | 74—365 |
| 2,816,454 | 12/57 | Hosea et al. | 74—365 |
| 2,851,138 | 9/58 | Straub et al. | |
| 2,872,003 | 2/59 | Nussbaumer | 192—51 |

DON A. WAITE, *Primary Examiner.*

SAMUEL LEVINE, BROUGHTON G. DURHAM,
*Examiners.*